United States Patent [19]

Skach et al.

[11] 4,316,708

[45] Feb. 23, 1982

[54] MACHINE FOR CONTINUOUSLY MOLDING SOLID PELLETS FROM A MUD COMPOSITION

[75] Inventors: Allen G. Skach; David L. Childress, both of Angleton; William V. Hayes, Clute, all of Tex.

[73] Assignee: The Dow Chemical Company, Midland, Mich.

[21] Appl. No.: 811,739

[22] Filed: Jun. 30, 1977

[51] Int. Cl.³ ............................................. B28B 13/00
[52] U.S. Cl. ..................................... 425/73; 425/218; 425/437; 425/446
[58] Field of Search .................. 425/218, 362, 378 R, 425/437, 447, 449, 404, 446, 73

[56] References Cited

U.S. PATENT DOCUMENTS

| | | | |
|---|---|---|---|
| 713,570 | 11/1902 | Monroe | 425/362 X |
| 3,257,685 | 6/1966 | Butow et al. | 425/446 X |
| 3,427,683 | 2/1969 | Nazaruk et al. | 425/362 X |
| 3,432,579 | 3/1969 | Zavasnik | 425/404 X |
| 3,534,434 | 10/1970 | Zavasnik | 425/404 X |

*Primary Examiner*—John McQuade

*Attorney, Agent, or Firm*—V. Dean Clausen

[57] ABSTRACT

A machine and method of operation are disclosed for continuously molding solid pellets from a mud composition. In a specific application, the machine is useful for producing an oxidation catalyst in pellet form. The machine includes a rotatable disk having small openings therein, which provide mold cavities. As the disk is rotated, the mud composition is injected into the mold openings through an injection head, which rides against the front face of the disk. The mud is retained in each mold opening by a backing plate, which rides against the back face of the disk. Ambient air is passed through a heater located at the top of a housing which partially encloses the disk. The heated air is circulated downwardly on both sides of the disk to dry the mud in the mold openings. An ejection head is positioned such that it rides against the front face of the rotating disk at a point behind the injection head. Pressurized air is forced through air passages in the ejection head, which register with the mold openings. The air ejects the dried pellets, and they fall into a collection chute on the back side of the disk.

5 Claims, 5 Drawing Figures

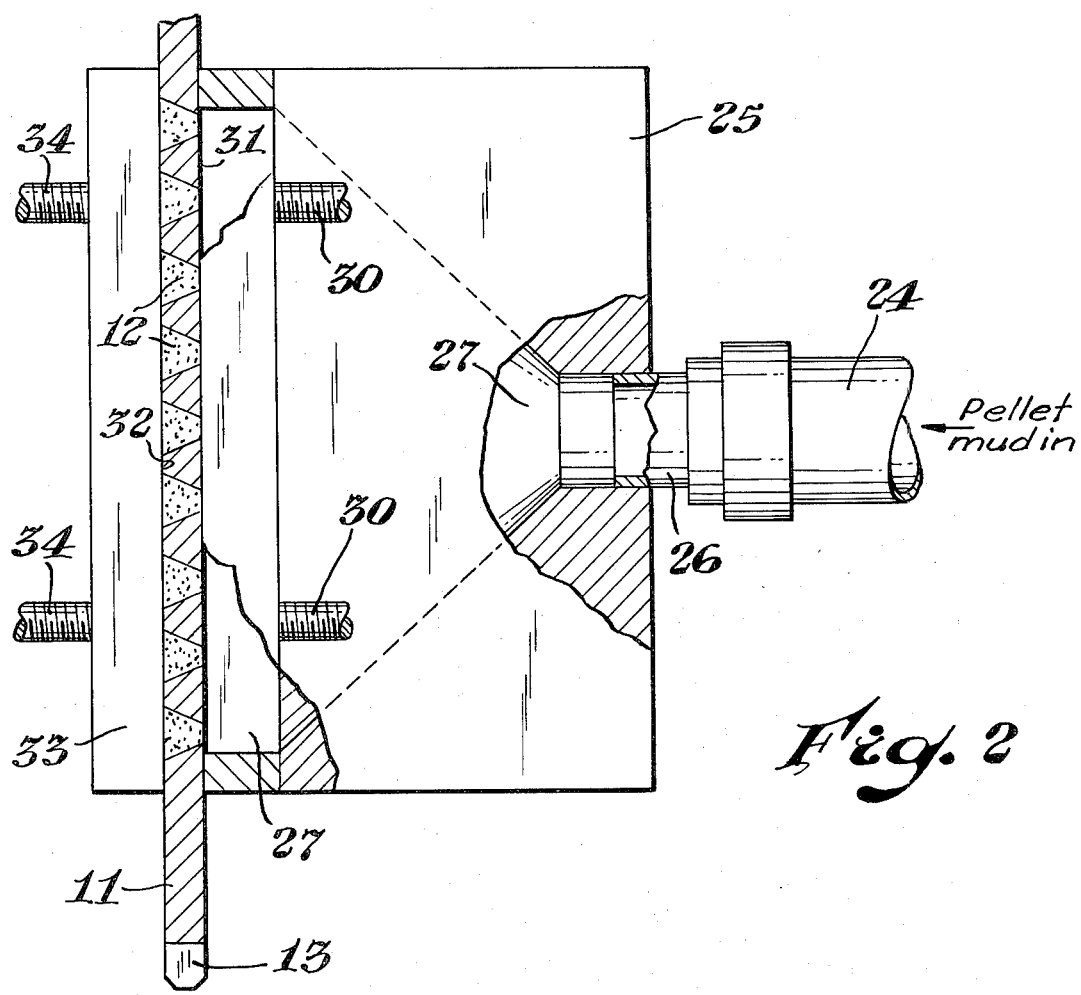
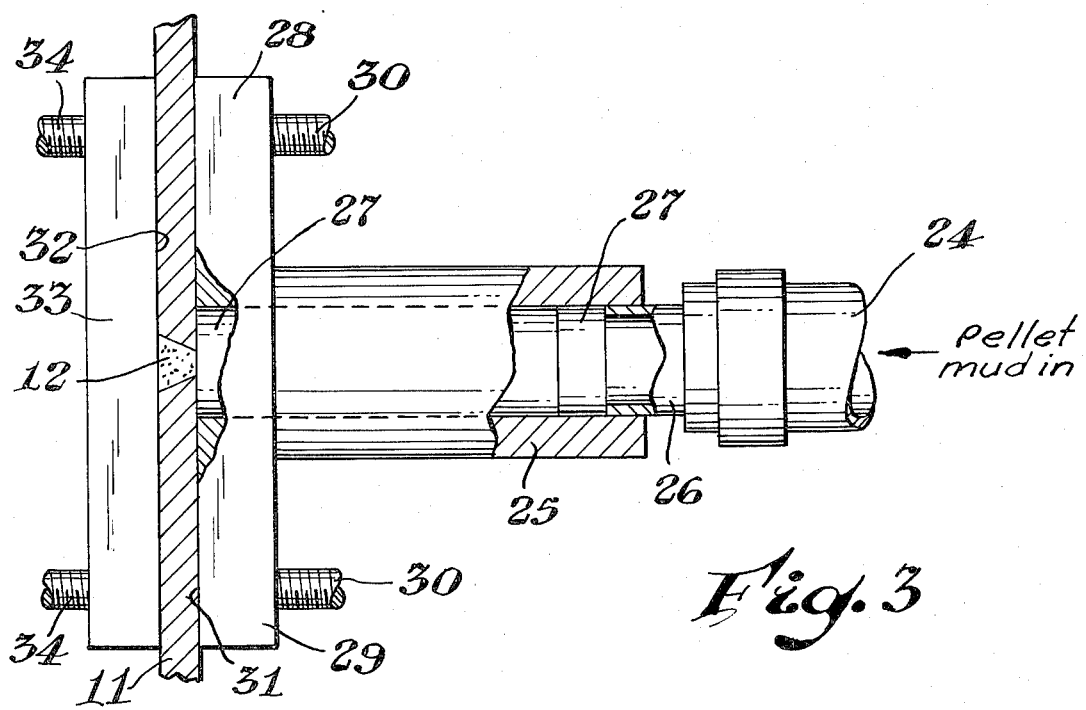

MACHINE FOR CONTINUOUSLY MOLDING SOLID PELLETS FROM A MUD COMPOSITION

BACKGROUND OF THE INVENTION

This invention relates to molding of solid pellets from a semi-solid material. More specifically, the invention concerns a machine in which a mud composition is injected into mold openings in a rotating disk, and the composition is dried to produce solid pellets.

Acrolein is a chemical compound useful for producing various intermediate compounds, such as acrylic acid, acrylonitrile, glycerine and methionine. In a well known process for producing acrolein, the product is obtained from the vapor phase oxidation of propylene in the presence of a suitable oxidation catalyst. A recent improvement in a catalyst composition used in the manufacture of acrolein is described in U.S. patent application Ser. No. 640,616, filed Dec. 15, 1975, now U.S. Pat. No. 4,049,577. Briefly, the oxidation catalyst described in this reference is prepared by mixing certain metal salts, such as oxides of cobalt, iron, bismuth, molybdenum and potassium, in a water solution.

The resulting slurry is a thixotropic mixture which contains about 65 percent water, by weight. The slurry is then dried by mechanical means to reduce the moisture content to about 10–30 percent water, by weight. After drying, this composition is in the form of a light clay which can be molded to produce solid products, such as spherical or cylindrical pellets. The pellets are then calcined to produce the oxide form of the catalyst material.

Although a spherical shape is preferred, the oxidation catalyst is usually molded in the form of a cylindrical pellet, since it is easier to mold the material in a cylindrical shape. In the molding operation it is essential to produce catalyst pellets which have a uniform shape and size. For example, if the pellets are of irregular shapes and sizes the pellets will not stack properly in the catalyst bed in the reactor. The result can be a catalyst bed which does not have sufficient void passages between the pellets to achieve a good vapor phase oxidation of the propylene starting material.

Extrusion molding and injection molding are examples of techniques which have been used in the past to produce the catalyst pellets. Neither of these methods has been satisfactory for producing pellets of a uniform size and shape. In a typical extraction molding procedure the light clay, which is a soft composition, is forced through a circular die hole. The material extruded through the die hole forms a cylindrical strand, which is cut into short pieces. It is difficult to control the feed rate of the strand, and the result is that the length of each piece may vary considerably. Another problem is that when the soft strand is cut into short pieces, the cylindrical pellets frequently have jagged edges when dried. When the pellets are placed in the reactor the jagged edges will flake off and create a dust problem in the reactor.

In a typical injection molding procedure a screw conveyor forces the soft clay composition into a two-piece die. Each die face has a hemispherical shape, so that the complete mold forms a spherical pellet. The pellet is dried by heaters positioned in the mold. When the mold is opened the spherical pellets will sometimes rupture at the seam. This is due to a sudden release of steam from the inside of the pellet. An additional problem is that the pellets will frequently stick to the die face, so that they are damaged when removed from the mold.

SUMMARY OF THE INVENTION

In the practice of this invention solid pellets are molded from a mud composition. The molding machine used for this purpose includes a disk which is rotatable about a central axis. In the disc are spaced apart mold openings which extend completely through the disk. The disk is rotated by a drive means which engages the disk. A housing member partially encloses the disk. An air intake section communicates with the housing member and a blower which connects into the air intake section forces ambient air through the intake and into the housing member. Inside the air intake is a heater unit which heats the ambient air to a temperature suitable for drying the mud composition in the mold openings of the disk. The present molding machine includes a pellet injection head having a surface which rides against the front face of the disk during rotation of the disk. Inside the pellet injection head is a continuous passageway. One end of this passageway will intermittently communicate with a given number of the mold openings while the disk is rotating. The opposite end of this passageway is connected into a container for the mud composition.

While the disk is rotating the mud composition is directed from its container into the mold openings of the disk. On the back face of the disk, at a point directly opposite to the pellet injection head, is a backing plate. The backing plate has an inside surface which rides against the back face of the disk and blocks the mold openings which are filled with the mud composition. During filling of the mold openings overflow mud will collect on the front and back faces of the disk. This overflow mud is removed by scraper blades. One pair of scraper blades has an edge which rides against the front face of the disk; and the other pair of scraper blades has an edge which rides against the back face of the disk.

Several baffle plates are secured to the inside of the housing member. Each baffle plate is split at the center and this split defines a path in which the disk can rotate. The baffle plates cause the downwardly moving heated air to circulate, in a zig-zag path, along the front and back faces of the rotating disk. The heated air dries the mud in the mold openings, so that a solid pellet is formed in each of the mold openings. The present machine also includes a pellet ejection head having a surface which rides against the front face of the disk, while the disk is rotating.

Inside the pellet ejection head is a series of separated passageways. While the disk is rotating one end of each passageway in the pellet ejection head will intermittently communicate with one of the mold openings which contains a dried solid pellet. The opposite end of each of these passageways connects into a source of pressurized air. As the rotating disk brings the filled mold openings into alignment with the passageways in the pellet ejection head, the pressurized air is applied to push each pellet out of its mold opening. The ejected pellets fall into a collector means positioned adjacent to the back face of the rotating disk. The heated air which dries the pellets in the mold openings is carried away from the rotating disk through an air outlet conduit, which is connected into the bottom of the housing member.

DESCRIPTION OF THE DRAWINGS

FIG. 2 is a detail view, partly in section, of a pellet injection head and a backing plate, which are components of the pellet molding machine illustrated in FIG. 1. This view is taken along line 2—2 of FIG. 1.

FIG. 3 is a left end view, partly in section, of the pellet injection head and backing plate shown in FIG. 2.

DESCRIPTION OF A PREFERRED EMBODIMENT

Figure 1:
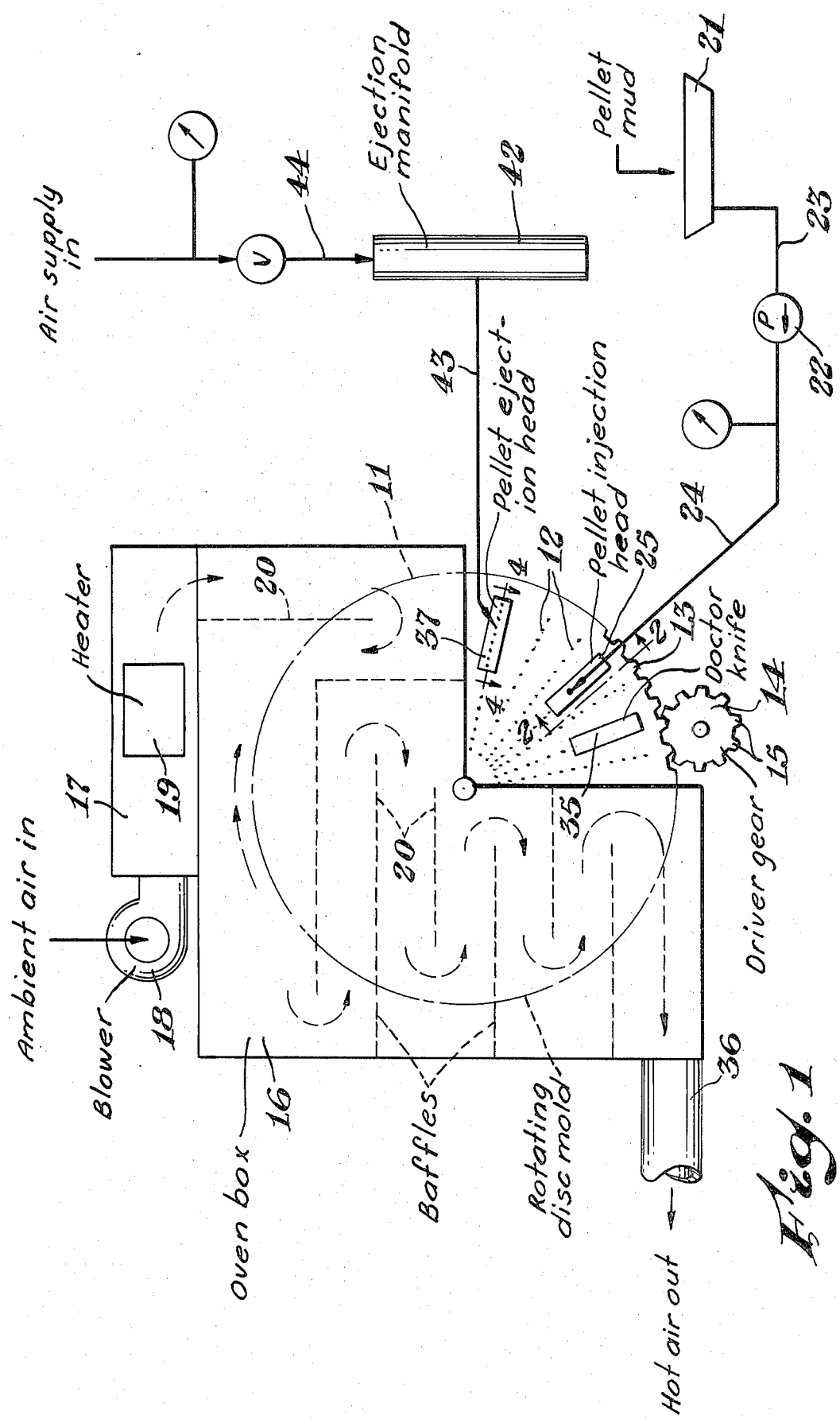
FIG. 1 is an elevation view, in schematic illustration, of one embodiment of the pellet molding machine of this invention.

Referring to the drawing, particularly FIG. 1, numeral 10 generally designates the pellet molding machine of this invention. The main component of this machine is provided by a circular disk 11, which is rotatable about its central axis. Circular openings 12 in disk 11 provide a means for molding mud compositions into solid pellets. In FIG. 1 the disk 11 is shown in a side elevation view. As indicated in FIG. 1, the openings 12 are arranged in straight rows which lie along the radius of the disk. Each of the straight rows comprises two groups, with nine (9) openings in each group.

The entire periphery of disk 11 is defined by gear teeth 13. Means for rotating disk 11 is provided by a driver gear 14. The periphery of gear 14 is defined by gear teeth 15 which mesh with the gear teeth of disk 11. Gear 14 is driven by a motor (not shown). A housing member 16 fits over the disk 11, such that it encloses about 75 percent of the disk area. An air intake section 17 is mounted on the top wall of housing 16. An opening along the bottom of air intake 17 communicates with an opening in the top wall of housing 16. These openings are not shown in the drawing.

A blower 18 is connected into the left end of the air intake section 17, and a heater 19 is installed inside of the air intake. In the practice of this invention a commercially available resistance heater is used. Other types of commercially available heaters are suitable for use in the machine 10. A stack of separated baffle plates are secured to the inside of the housing 16. Each of these baffle plates, indicated by numeral 20, is split lengthwise along the center of each plate. The center split in each baffle, which is not shown, provides a space through which the disk 11 can rotate.

To illustrate the practice of this invention a typical molding operation will now be described. In this description the mud composition which is being molded into solid pellets is the catalyst composition, used in producing acrolein, as described earlier. At the start of the operation the mud composition is contained in a hopper 21. Hopper 21 is one component of the feed assembly which defines part of the present machine. A second component of the feed assembly is a progressive cavity pump 22. A conveyor screw 23 connects the hopper 21 into the inlet of pump 22.

One end of a feed line 24 connects into the outlet side of pump 22. The opposite end of feed line 24 connects into a pellet injection head 25. Referring particularly to FIGS. 2 and 3, the feed line 24 is secured to a coupling 26, which fits into a passageway 27 defined in the injection head 25. As shown in FIG. 3 the injection head 25 has an upper shoulder 28 and a lower shoulder 29. Fastened into each shoulder is a pair of threaded studs 30.

The studs 30 are fastened into a cross-member, which forms part of a support frame on which the disk 11 is rotatably mounted. To simplify the illustration the support frame is not shown in the drawing. When the pellet injection head 25 is mounted in its fixed operating position on the cross-member of the support frame, the front surface 31 of the injection head will ride against the front face of disk 11 as the disk rotates. The driver gear 14 rotates the disk 11 at a continuous speed, which can be varied to suit the operating conditions. As the disk 11 rotates, each group of the mold openings 12 are brought into alignment with the mouth of passageway 27 in the injection head 25.

While the disk is rotating the pump 22 is continuously forcing the mud composition through the feed line 24 and the passageway 27. Therefore, as each group of mold openings passes the mouth of passageway 27, the mud composition is forced into these openings. The pressure at which the mud composition is injected into the mold openings 12 will vary between 10 psig and 60 psig. The actual pressure applied to the mud composition is determined chiefly by the moisture content of the composition. While the disk is rotating the front surface 32 of a backing plate 33 rides against the back face of the disk. Backing plate 33 is fastened by studs 34 into another cross-member of the support frame mentioned earlier. The surface 32 forms a bottom wall for each of the mold openings 12 and thus enables the mud composition to be retained in each opening during the injection step.

A scraper blade 35 (also referred to as a doctor knife) is fastened to a cross-member of the support frame below the pellet injection head 25. The bottom edge of the scraper blade (not shown) rides against the front face of disk 11 to remove overflow mud from the mold openings which collects on the face of the disk. After each of the filled mold openings rotates past the bottom center point of disk 11, the mold openings begin to move upwardly through the housing 16. At the same time the heated air from air intake 17 is moving downwardly through the housing 16. As indicated by the arrows in FIG. 1, the baffle plates 20 cause the heated air to circulate, in a zig-zag path, along the front and back faces of the rotating disk 11.

The circulating heated air thus dries the mud composition and forms a solid pellet in each mold opening. When the circulating hot air reaches the bottom of housing 16 it is carried away from the rotating disk 11 through an outlet conduit 36. The opposite end of conduit 36 is connected into a vent hood (not shown). The drying air is heated to a temperature which will effectively dry the mud composition in the mold openings. This temperature is determined by factors such as moisture content of the pellet composition. To effectively dry the catalyst composition described herein the temperature of the drying air should be at least 160° C.

Figure 4:
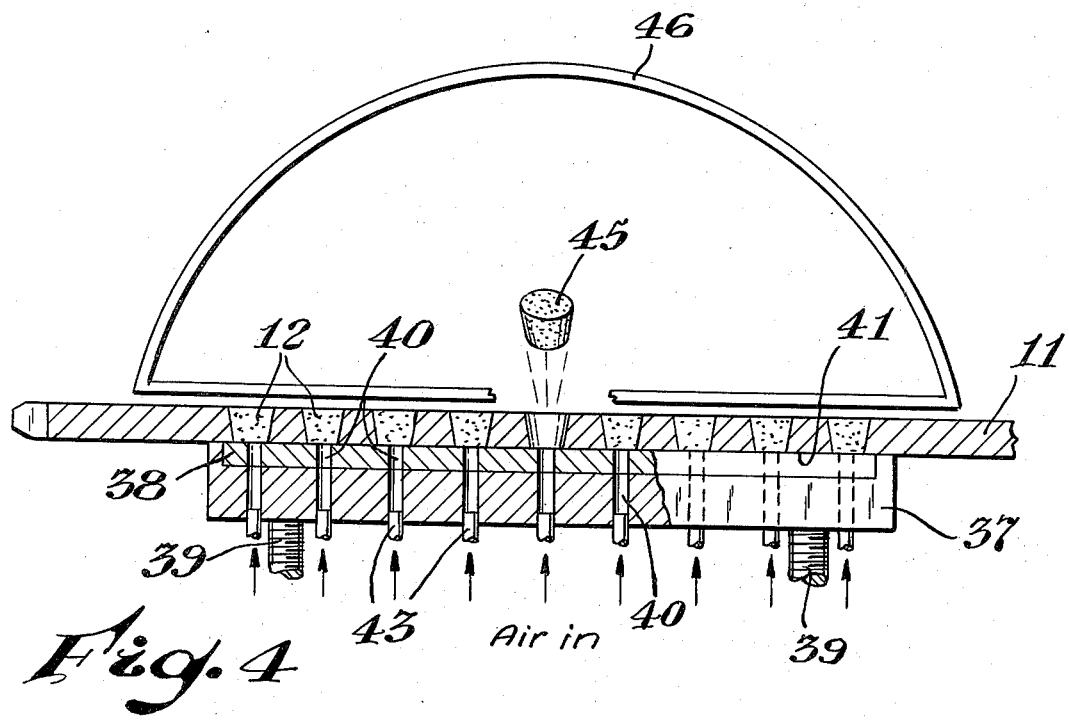
FIG. 4 is a detail view, partly in section of a pellet ejection head and collector chute which are components of the pellet molding machine illustrated in FIG. 1. This view is taken along line 4—4 of FIG. 1.
Figure 5:
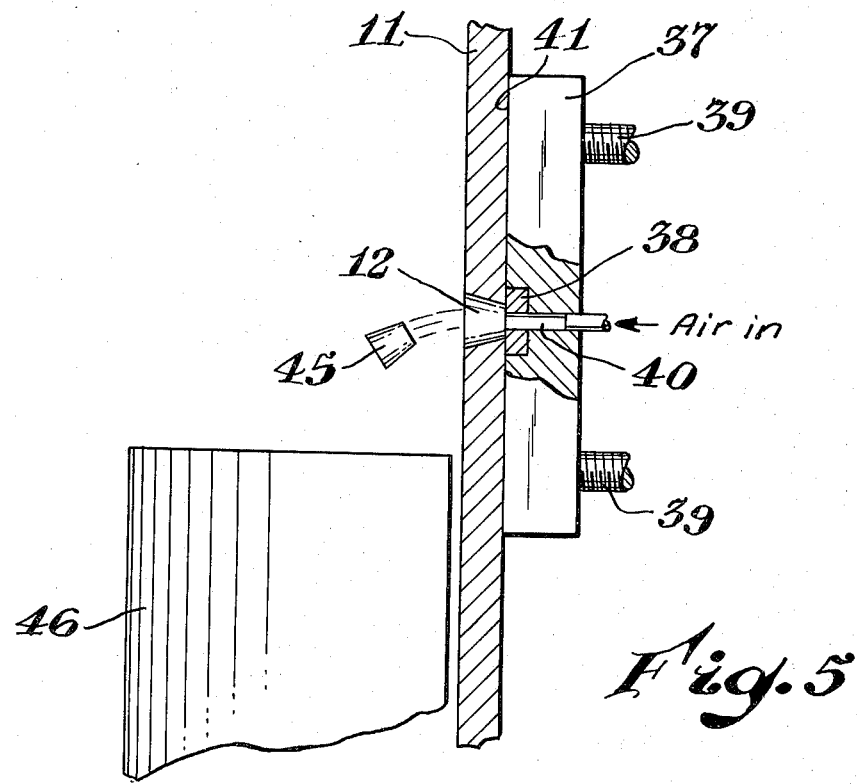
FIG. 5 is a left end view, partly in section of the pellet ejection head and collector chute shown in FIG. 4.

A pellet ejection head 37 provides means for removing each solid pellet from its mold opening. As shown in FIGS. 1, 4 and 5, the pellet ejection head 37 is a flat plate. The head 37 also includes a rectangular insert plate 38 which is recessed into the front surface of the head 37. The pellet ejection head 37 is secured to a cross-member of the support frame by threaded studs 39. In head 37 there are eighteen (18) small diameter holes 40. The holes 40 are set in a straight line and are spaced apart, to define separated passageways which extend through the head 37 and insert 38. Referring to FIG. 4, the drawing was simplified by showing only nine (9) holes in head 37.

While the disk 11 is rotating the front surface 41 of insert 38 rides against the front face of the disk. At a given point during rotation of disk 11 the mold openings 12, which are filled with solid pellets, will line up with the passageways 40 in head 37. A tube line 43 connects each of the passageways 40 into an air manifold 42. Manifold 42 contains air under pressure, which is received from a regulated air supply through line 44. At the moment that the mold openings 12 pass in front of passageways 40, pressurized air from manifold 42 pushes each solid pellet 45 out of its mold opening.

Positioned adjacent to the back face of disk 11 is a collection chute 46. The top edge of chute 46 lies below the point at which the passageways 40 are in contact with the front face of the rotating disk. This arrangement allows each pellet 45 to drop into chute 46 as it is ejected from its mold opening. The bottom end of chute 46 communicates with a storage container (not shown) in which the ejected pellets are collected.

Various structural details in the machine 10 were not illustrated in the drawings to simplify the present description. These details will now be described to provide a more complete explanation of the practice of this invention. In the drawings the machine 10 is shown as having one pellet injection head 25, one backing plate 33, one scraper blade 35 and one pellet ejection head 37. The actual production machine includes two pellet injection heads, two corresponding backing plates for the pellet injection heads, and four scraper blades. As illustrated, the machine has only one pellet ejection head, which performs the complete ejection step.

A plastic resin gasket is fitted against the front face of each injection head and each ejection head. The resin gaskets thus ride against the front face of the rotating disk to provide a seal for the injection and ejection heads which will not scratch the face of the disk. Two of the scraper blades ride against the front face of the disk and the other two scraper blades ride against the back face of the disk. All of the scraper blades are constructed of a plastic resin. In addition, the disk, which is fabricated of metal, is coated with a thin layer of a plastic resin material to protect the metal from compositions which may have corrosive properties.

Each of the mold openings 12 in disk 11 is tapered slightly, from the front face to the back face of the disk. The tapered configuration makes it easier to dislodge the solid pellets from the mold openings, than would be the case if the openings had straight walls. In practice, the machine of this invention may be used to mold most materials which can be forced into a mold cavity and thereafter cured by heating, by cooling, or by chemical reaction. This includes mud compositions or other semi-solid materials. Mud compositions may be generally defined as sticky mixtures of solid materials with a liquid, especially water.

The invention claimed is:

1. A machine for continuously molding solid pellets from a mud composition, the machine comprising:
    a disk which is rotatable about a central axis, which has a front face, a back face, and mold openings which extend completely through the disk and which are spaced apart;
    a drive means which engages the disk, for rotating the disk;
    a housing member which partially encloses the disk;
    an air intake section which communicates with the housing member;
    a blower means which connects into the air intake section, for forcing ambient air through the air intake section and into the housing member;
    a heater means positioned inside the air intake section, for heating the ambient air to a temperature suitable for drying the mud composition;
    at least one pellet injection head having a surface which rides against the front face of the disk during rotation of the disk;
    the pellet injection head including a passageway therein which is in direct and intermittent communication with a given number of the mold openings during rotation of the disk, and which is connected into a container for the mud composition, the passageway being adapted for directing the mud composition from the mud container directly into the mold openings during rotation of the disk;
    at least one backing plate having a surface which rides against the back face of the disk at a point directly opposite to the pellet injection head, the surface of the backing plate thereby blocking the group of mold openings in communication with the pellet injection head;
    at least one scraper blade having an edge which rides against the front face of the disk, ahead of the pellet injection head, during rotation of the disk, the scraper blade thereby removing overflow mud which collects on the front face of the disk;
    at least one scraper blade having an edge which rides against the back face of the disk, ahead of the pellet injection head, during rotation of the disk, the scraper blade thereby removing overflow mud which collects on the back face of the disk;
    a stack of separated baffle plates which are secured to the inside of the housing member, each baffle plate having a central split therein, the split defining a path in which the disk can rotate;
    the baffle plate stack providing a means for circulating the heated air along the front and back faces of the rotating disk, to dry the mud composition and thereby form a solid pellet in each mold opening;
    at least one pellet ejection head having a surface which rides against the front face of the disk during rotation of the disk; the pellet ejection head having separated passageways therein, each passageway being in intermittent communication with one of the mold openings during rotation of the disk, and each passageway being connected into a source of pressurized air, the pellet ejection head being adapted to direct the pressurized air into each mold opening in communication with a passageway, to eject the solid pellet from each mold opening;
    a collector means positioned adjacent to the back face of the disk, at a point below the position of the pellet ejection head on the front face of the disk, to collect the ejected pellets; and
    an air outlet conduit which connects into the housing member for carrying the heated air away from the disk.

2. The machine of claim 1 in which the disk is mounted in a vertical position in a support member.

3. The machine of claim 1 which includes at least two pellet injection heads.

4. The machine of claim 1 which includes at least two backing plates.

5. The machine of claim 1 in which the mold openings are circular holes which taper from the back face to the front face of the disk.

* * * * *